(12) United States Patent
Douglis et al.

(10) Patent No.: US 10,007,809 B1
(45) Date of Patent: Jun. 26, 2018

(54) FINE-GRAINED SELF-SHREDDING DATA IN A SECURE COMMUNICATION ECOSYSTEM

(71) Applicant: EMC Corporation, Hopkinton, MA (US)

(72) Inventors: Frederick Douglis, Basking Ridge, NJ (US); Radia Perlman, Hopkinton, MA (US); Philip Shilane, Yardley, PA (US); Grant Wallace, Pennington, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 14/836,761

(22) Filed: Aug. 26, 2015

(51) Int. Cl.
*G06F 21/78* (2013.01)
*H04L 9/08* (2006.01)

(52) U.S. Cl.
CPC ............ *G06F 21/78* (2013.01); *H04L 9/0894* (2013.01)

(58) Field of Classification Search
CPC ....... G06F 21/10–21/12; G06F 21/60–21/604; G06F 21/62–21/6272; G06F 21/78; G06F 2221/0771; G06F 2221/2107; G06F 2221/2137; H04L 9/08; H04L 9/0886; H04L 9/0891–9/0897; H04L 63/10; H04L 63/108; H04L 2209/60; H04L 2209/603
See application file for complete search history.

(56) References Cited

U.S. PATENT DOCUMENTS

| | | | |
|---|---|---|---|
| 7,593,532 B2 * | 9/2009 | Plotkin | H04L 9/0894 380/284 |
| 7,596,696 B1 | 9/2009 | Perlman | |
| 8,825,626 B1 | 9/2014 | Wallace | |
| 2005/0223414 A1 * | 10/2005 | Kenrich | G06Q 20/3674 726/27 |
| 2006/0059016 A1 * | 3/2006 | Ogilvie | G06F 21/6245 705/2 |
| 2012/0317414 A1 * | 12/2012 | Glover | G06Q 10/101 713/165 |
| 2014/0029751 A1 * | 1/2014 | Swineford | H04L 63/0428 380/279 |

* cited by examiner

*Primary Examiner* — Kevin Bechtel
(74) *Attorney, Agent, or Firm* — Womble Bond Dickinson (US) LLP

(57) ABSTRACT

One embodiment provides a document management system comprising a storage system to store one or more encrypted documents, at least a first portion of a first encrypted document encrypted using a first encryption key, and an encryption key manager to manage a set of encryption keys for the documents on the storage system, the encryption key manager further to discard the first encryption key to provide secure removal of the portion of the encrypted document.

24 Claims, 10 Drawing Sheets

US 10,007,809 B1

FINE-GRAINED SELF-SHREDDING DATA IN A SECURE COMMUNICATION ECOSYSTEM

FIELD OF THE INVENTION

Embodiments relate generally to secure communication ecosystems. More particularly, embodiments relate to fine-grained self-shredding data in a secure communication ecosystem.

BACKGROUND

When document production is performed entirely in a non-electronic format (e.g., paper), it may be possible to develop a draft of a paper and then shred the draft, effectively removing all traces of the draft. Paper document shredding may be important for legal, privacy, or compliance reasons. Shredding the draft would destroy not only the printed text but also any annotations that were made on the draft. These annotations may have included edits, comments, and/or other markup.

When developing, drafting, editing, or collaborating using electronic documents, such "shredding" becomes more difficult. Electronic documents may be stored on computer media, edited using electronic document editing tools, and communicated to other individuals or groups of individuals (e.g., via electronic mail or other mechanisms) for review. Each intermediate version of a document leaves an electronic copy that may be saved in computer media, potentially both on systems belonging to the participants and on systems providing the electronic communication, such as mail or file servers. Moreover, each of these systems periodically saves copies of their data on other media, such as magnetic tape, backup servers, or other systems. Under some circumstances, the intermediate electronic copies of the document may result in a security risk, or present other information-related risks. Accordingly, it may be beneficial for a secure communication ecosystem to provide the ability to electronically "shred" some or all portions of intermediate document versions that are generated during electronic document collaboration.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
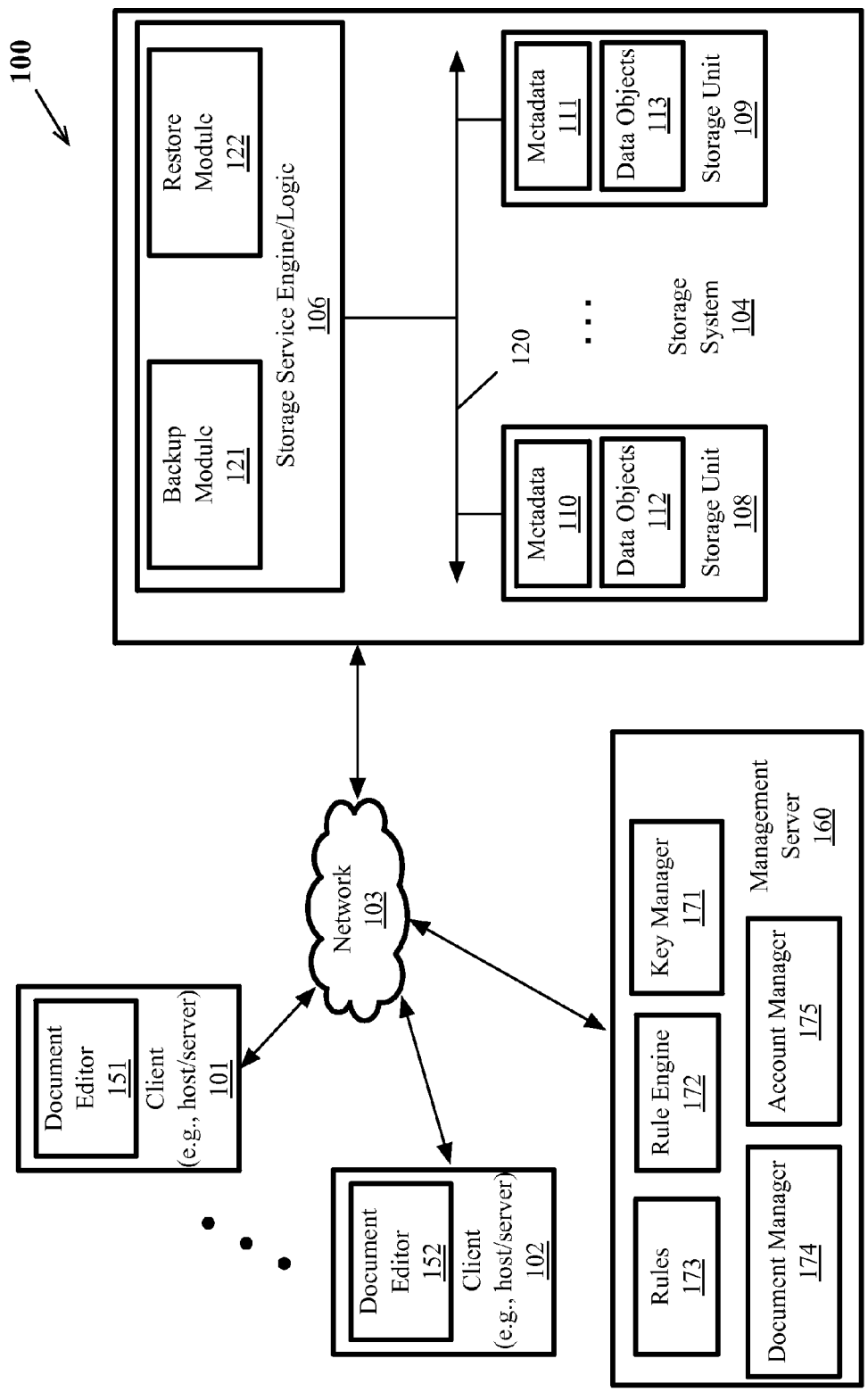
FIG. 1 is a block diagram illustrating a document management and storage system according to an embodiment.

Embodiments are described which provide a document collaboration system in which comments and drafts are handled in such a manner that the individual comments and drafts can be electronically shredded individually or in groups. In the following detailed description, specific details are described to enable a secure editing and communication ecosystem to isolate individual changes or groups of changes and make the changes or groups of changes selectively shreddable. Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

In some cases, it may be desirable to remove, or "shred," all copies of an electronic document. In other cases it is desirable to shred all interim copies while retaining the final version. This would be equivalent to shredding all the marked-up paper copies with various edits and comments while retaining the final "clean" document incorporating all changes. However, with numerous copies of a file stored in various locations, it becomes significantly more difficult to ensure most or all copies of a document are removed or deleted. Embodiments described herein provide techniques to enable secure collaboration, editing, and drafting of documents while enabling intermediate versions, markups, comments, citations, edits, or other data to be rendered inaccessible. Accordingly, specific edits to a computer document, can be made unreadable in a fashion that prevents these edits from being recovered in the future.

To remove or shred an electronic document, all undesired copies of the document can be rendered unreadable. In one embodiment, shredding is accomplished by encrypting the document using an encryption key that will expire after a certain period of time. When the encryption key expires, the encryption key for the document is destroyed and the encrypted document is rendered inaccessible. To support this technique, a document management system can enforce access and data handling rules to maintain security of the document data. The document management system, in concert with a data storage system, can prevent the storage of the document unless a specific, time-limited encryption key is used to encrypt the document before storage. Additionally, a key management system manages the encryption keys used to access the encrypted documents. Under specified conditions, (e.g., time-based key expiration, a shred command from an administrator) encryption keys associated with the documents to be shredded are discarded, erased, deleted or otherwise removed from the system, effectively rendering the shredded documents inaccessible.

To interact with a document in the secure ecosystem described herein, embodiments provide for specialized application software. In one embodiment, a cloud-based document editing system is provided that decrypts document data in a remote environment that renders an image-based display of the decrypted text. The display of the rendered decrypted text can be performed over a secure communication link (e.g., via an encrypted network connection).

In one embodiment, a secure document can be edited using document-editing application on a local (e.g., non-remote) system. The document-editing application can be an existing document editing or word processing application (e.g., the Word document editing application provided by the Microsoft® corporation, or an equivalent application) that allows modifications via third-party plugins. Alternatively, a custom-designed software application can be used. The document-editing software is configured to disable standard file-system caching and to store the document only when encrypted using the encryption key associated with the document. Other document security features may be enabled to prevent printing or other mechanisms in which document data can leak outside of the secure environment. In one embodiment the document-editing application communicates with a key manager whenever a document is to be decrypted or encrypted and the key is not stored locally on the client system. In an alternate embodiment the key manager can decrypt the content and transmit the decrypted content to the application over an encrypted communication channel (e.g., SSL).

In one embodiment, individual edits to a document can be discretely encrypted via separate keys. These keys can be specific to a document, a user, a group of users, or combinations thereof (via multiple layers of encryption). In such embodiment, each individual edit, such as a comment or text modification, can be separately and securely deleted or otherwise made inaccessible without affecting the document as a whole.

System Overview

FIG. 1 is a block diagram illustrating a document management and storage system 100 according to an embodiment. The system 100 includes, but is not limited to, one or more client systems 101-102 communicatively coupled to storage system 104 over network 103. The clients 101-102 can include document editor logic 151-152 to perform secure document edits as described herein. The secure document editor can store modifications, edits, comments, or other changes to documents in a discretely encrypted manner, such that any change or set of changes can be securely deleted by discarding the encryption key or keys associated with the set of changes to securely delete.

The clients 101-102 may be any type of clients such as a host or server computing system, a personal computer (e.g., desktops, laptops, and tablets), a "thin" client, a personal digital assistant (PDA), a Web enabled appliance, or a mobile phone (e.g., Smartphone), etc. Alternatively, any of the clients 101-102 may be a primary storage system (e.g., local data center) that provides storage to other local clients, which may periodically back up the content stored therein to a backup storage system (e.g., a disaster recovery site or system), such as storage system 104. Any of the clients 101-102 and 104 can be configured as virtualized platforms hosting one or more virtual machines to provide virtualized storage services. The network 103 may be any type of network such as a local area network (LAN), a wide area network (WAN) such as the Internet, a storage network, or a combination thereof. The network 103 may be or include components of a fiber-optic network or a copper-wire network, or may be at least in part based on a wireless network. The clients 101-102 may be in physical proximity or may be physically remote from one another. Additionally, the storage system 104 may be located in proximity to one or both of the clients or may be remote from either or both of the clients 101-102.

The storage system 104 may include or represent any type of servers or a cluster of one or more servers (e.g., cloud servers). For example, the storage system 104 may be a storage server used for various purposes, such as to provide multiple users or client systems with access to shared data and/or to back up (or restore) data (e.g., mission critical data). The storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. The storage system 104 may further provide storage services via an object-based protocol and Hadoop distributed file system (HDFS) protocol.

In one embodiment the storage system 104 includes, but is not limited to, storage service engine 106 (also referred to as service logic, service module, or service unit, which may be implemented in software, hardware, or a combination thereof), and one or more storage units or devices 108-109 communicatively coupled to each other. The storage service engine 106 may represent any storage service related components configured or adapted to provide storage services (e.g., storage as a service) to a variety of clients using any of the access protocols set forth above. For example, the storage service engine 106 may include backup logic 121 and restore logic 122. The backup logic 121 is configured to receive and back up or replicate data from a client (e.g., clients 101-102) and to store the backup data in any one or more of storage units 108-109. The restore logic 122 is configured to retrieve and restore backup data from any one or more of storage units 108-109 back to a client (e.g., clients 101-102).

Segments of data files (e.g., documents) may be stored either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains. The segmented manner in which data may be stored on the system 104 can be used to facilitate the fine-grained nature of fine-grained self-shredding data. In one embodiment, different data objects 112-113 of each storage unit 108-109 can be used to store different versions of a document or different portions of a document. In such embodiment, spanning the documents and/or document versions across multiple data objects 112-113 can enable the separate encryption of different portions or versions of a document. However, embodiments are not limited to the use of the data objects 112-113 of the storage units 108-109 of the storage system, and other mechanisms can be used to discretely store and encrypt document data.

The storage units 108-109 may be implemented locally (e.g., single node operating environment) or remotely (e.g., multi-node operating environment) via interconnect 120, which may be a bus and/or a network (e.g., a storage network or a network similar to network 103). The storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In one embodiment a management server 160 provides resources to perform operations associated with management logic to facilitate fine-grained self-shredding data in a secure communication ecosystem as described herein. The management server 160 can include a set of rules 173 and a rule engine 172 to govern access to document data. The rules 173 can include a rule entry to specify that data associated with a securely managed document may not be stored by any of the clients 101-102, by the document editors 151-152 associated with the clients, and/or by the storage system 104 unless the data is encrypted by a specific encryption key provided by the key manager 171.

In one embodiment the management server 160 includes a document manager 174 to manage access to secure documents. The document manager 174 can manage access to the secure documents in association with an account manager 175. The account manager can facilitate authentication of users registered with the system and can associate encryption keys managed by the key manager 171 with registered users or groups of users on the system.

The key manager 171 can manage the generation, storage and deletion of encryption keys for secure documents. In one embodiment the key manager 171 directly creates, stores and distributes the encryption keys. In one embodiment, the key manager 171 facilitates the creation, storage, and distribution of the encryption keys via other components. For example the key manager 171 can generate keys using secure key generation and storage hardware of the management server 160 and may store the keys in an encrypted key database on the storage system 104. Additionally, the key manager 171 can mediate access to keys based on requests from the document manager 174 and/or account manager 175.

The system illustrated in FIG. 1 is exemplary and generally representative of embodiments described herein. However, the system may also include other hardware or software components used by or in conjunction with the details, processes, and operations described below.

Document Mapping, Encryption, and Deletion

Figure 2:
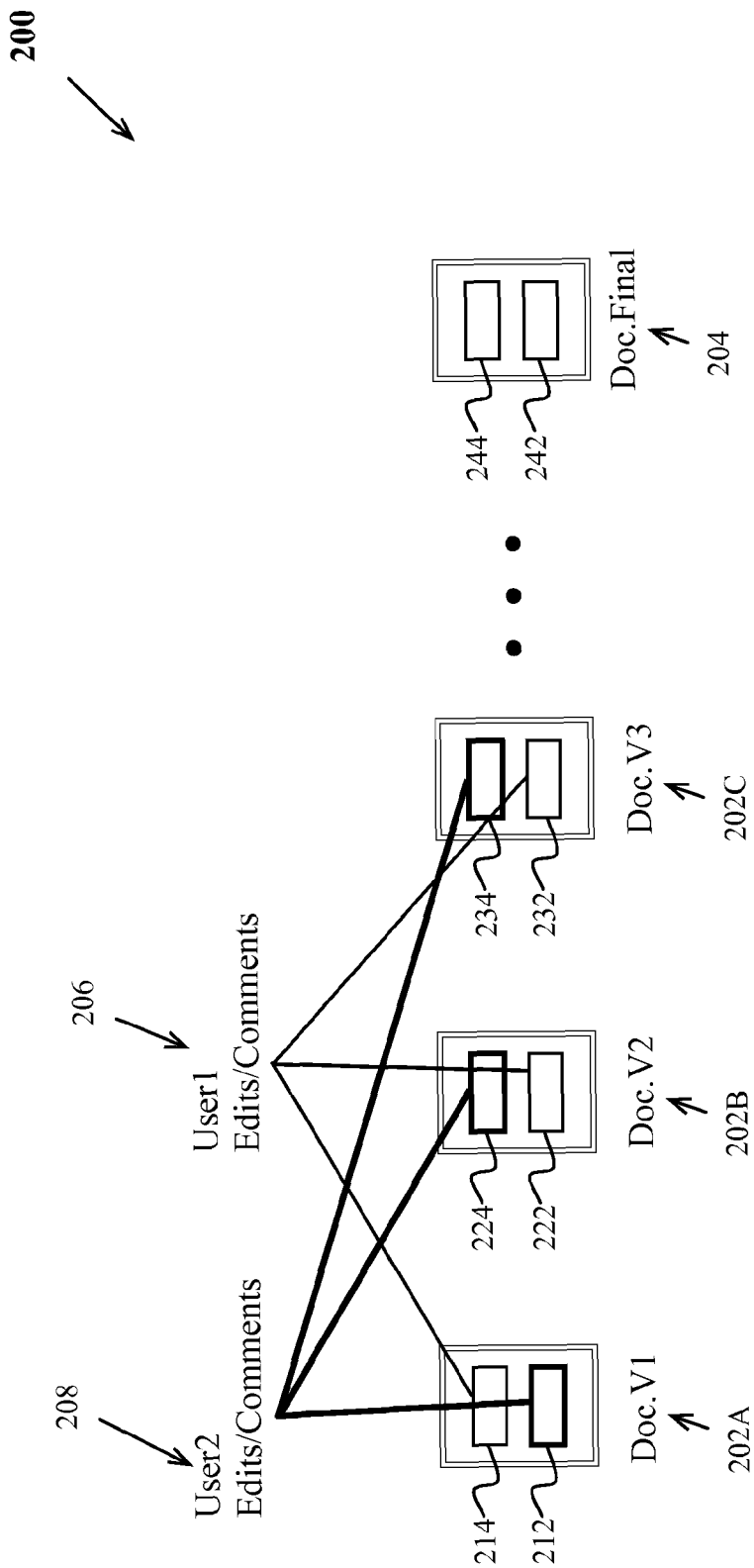
FIG. 2 is a block diagram of document data mapping and storage according to an embodiment.

FIG. 2 is a block diagram of a document data mapping and storage system 200 according to an embodiment. In one embodiment, data associated with a document can be stored as separate data objects within the various storage units of a storage system, as illustrated in the storage system 104 of FIG. 1, although the precise details of the underlying file system and storage devices can vary according to embodiments. FIG. 2 shows multiple intermediate documents revisions 202A-C and a final document 204. Edits, comments, and other portions of intermediate documents 202A-C can be stored as separate and distinct data objects. The separate data objects associated with the document can be stored and encrypted separately. For example, edits 214 associated with a first user 206 are applied to a first document version 202A can be stored as a separate data object from edits 212 associated with a second user 208 applied on the first document version 202A. Edits 222 associated with the first user 206 applied to a second document version 202B can be stored as a separate data object from edits 224 associated with the second 208 user applied the second document version 202B. Likewise, edits 232 from the first user 206 applied to a third document version 202C can be stored as a separate data object from edits 234 associated with the second user 208 that are made to the third document version 202C. In contrast, in one embodiment the final document 204 is stored a separate data object from the intermediate versions of the document. In one embodiment, a document version that is marked or otherwise indicated to be a final document version can be stored as a monolithic data object without the data object segmentation used for intermediate data objects, although not all embodiments operate in such a manner. In one embodiment, the final document remains segmented into multiple data objects 242, 244, although the historical data associated with the data objects may have been securely deleted.

The separate portions of each document can be mapped to separate data objects, which may each be stored separately. The encryption scheme applied to the separate data objects can vary among embodiments. In one embodiment, each separate portion (e.g., each individual document edit) can be encrypted using a separate key. The key used to encrypt the documents and/or portions of the documents can be specific to an individual document, a user, a group of users, or a combination thereof. In one embodiment, multiple layers of encryption may be used. In one embodiment, certain keys may be associated with, but not directly linked to a user, a group of users, or a combination thereof. For example, a second layer of encryption may be applied where the documents or a portion of the documents are encrypted using a first set of data keys and the first set of keys are encrypted using a second set of user keys, where the user keys are associated with a user or group of users. For example, the key manager 171 as in FIG. 1 can manage the set of data keys in conjunction with the document manager 174, while the account manager 175 can manage the assignment of user keys to users or groups of users.

Additionally, nested keys may be used to enable independent operations such as deleting all edits or comments by a user and/or all items in a document having a specific data classification (e.g., confidential). Using nested keys, should a user make a comment or edit that includes or references confidential material, all confidential material can be securely deleted by removing the confidential key and all material associated with a specific user can be securely deleted by removing the key associated with the specific user. Additionally, a key management system may be used in which each unit of data is encrypted with a key that is unique to the specific unit of data and each unit of data may be simultaneously encrypted with other keys, such as a key associated with a individual or organization. The key management system can then invalidate all data associated with a specific person or organization can by destroying the key associated with the person or organization.

Based on system configuration and usage model, data can be rendered inaccessible either synchronously with a delete operation or asynchronously with a delete operation. In other words, the storage system may perform a storage system delete operation associated with a data object in concert with the key manager discarding the key or set of keys associated with the object. Alternatively, an object may be deleted by a storage system and then the key manager can asynchronously discard encryption keys associated with the object, for example, during a periodic key rotation, rendering the deleted data inaccessible even if undeleted or recovered from the storage system. Furthermore, a key manager can immediately discard the key or set of keys associated with a data object to render the data immediately inaccessible, then the storage manager may asynchronously perform a garbage collection operation on previously used storage units or data objects associated with data that has been securely deleted. In one embodiment, one or more of the delete and secure delete operations are used based on the category of data to be securely deleted.

Data Categories

Document data may be divided into several categories. A first category of document data includes data that will not require secure deletion. Document data in the first category may be stored unencrypted, may be deleted normally, and may be subject to standard, insecure data handling rules. A second category is data that, at some point, will be securely deleted, indicating that the data should be removed from the system or otherwise rendered inaccessible, such that the data cannot be recovered from the storage system. This second category may be divided into several subcategories including a first sub-category of data that must be immediately securely deleted upon request, a second sub-category of data that can be immediately deleted then securely deleted at a later time, and a third sub-category of data that can be immediately deleted then securely deleted at a later time, but will remain in an interim (e.g., purgatory) state for some guaranteed minimum amount of time before the data is rendered permanently inaccessible.

The first sub-category of the second category includes data that must be immediately and securely deleted upon request. Data requiring immediate secure deletion can be securely deleted and rendered irrecoverable via one of several methods in various embodiments. In one embodiment, such data may be separately categorized and encrypted using a separate set of keys. When data that is flagged for immediate secure deletion is deleted, the key associated with that data may be immediately destroyed. In one embodiment, periodic key rotation is utilized, where data is periodically re-encrypted using a different key or set of keys and the first key or set of keys is retired. In such embodiment, a request to delete data that is to be immediately and securely deleted may trigger an immediate key rotation to a new key or set of keys, where the data to be deleted is not transitioned to the new key or set of keys and becomes inaccessible.

The second sub-category includes data that may be immediately deleted from the storage system and then may be securely deleted at some point in the future to render the data permanently inaccessible. Data in this sub-category may be immediately deleted using standard, storage system based deletion methods, then the underlying data object associated with the data object may be securely deleted or otherwise rendered inaccessible at some point in time, for example, during a periodic key rotation as used in one embodiment, in which the data to be securely deleted is not transitioned to (e.g., re-encrypted with) the new key or set of encryption keys, and the older key or keys used to access the data to be securely deleted are discarded, rendering the data inaccessible and unrecoverable from the storage system.

The third sub-category includes data that may be immediately deleted, may be securely deleted at some point in the future, but will be retained for a guaranteed minimum retention period, which is a period of time in which the data may be undeleted or recovered from the storage system before the key associated with the data is removed and the data is rendered permanently inaccessible. A guaranteed minimum retention period can be defined for certain categories of data, such that, if deleted, a key manager and storage system can cooperate to provide a guaranteed amount of time in which data can be recovered or 'undeleted.' For example, the underlying data objects associated with data in this subcategory may be immediately deleted using storage system based deletion methods and then the underlying data object may be protected from being overwritten, or the data object may be sent to a 'purgatory' region in which the data is separately retained during the retention period. The underlying data objects will be securely deleted at some point in time when the key manager discards the encryption key used to encrypt the data objects, but a data object will not be securely deleted as long as the retention period associated with the data object is active. While data may still be recovered outside of this guaranteed minimum retention period, the system will not make an effort to preserve the storage data objects associated with the data and the keys associated with the encrypted data objects may be discarded at any time once the retention period expires.

Figure 3:
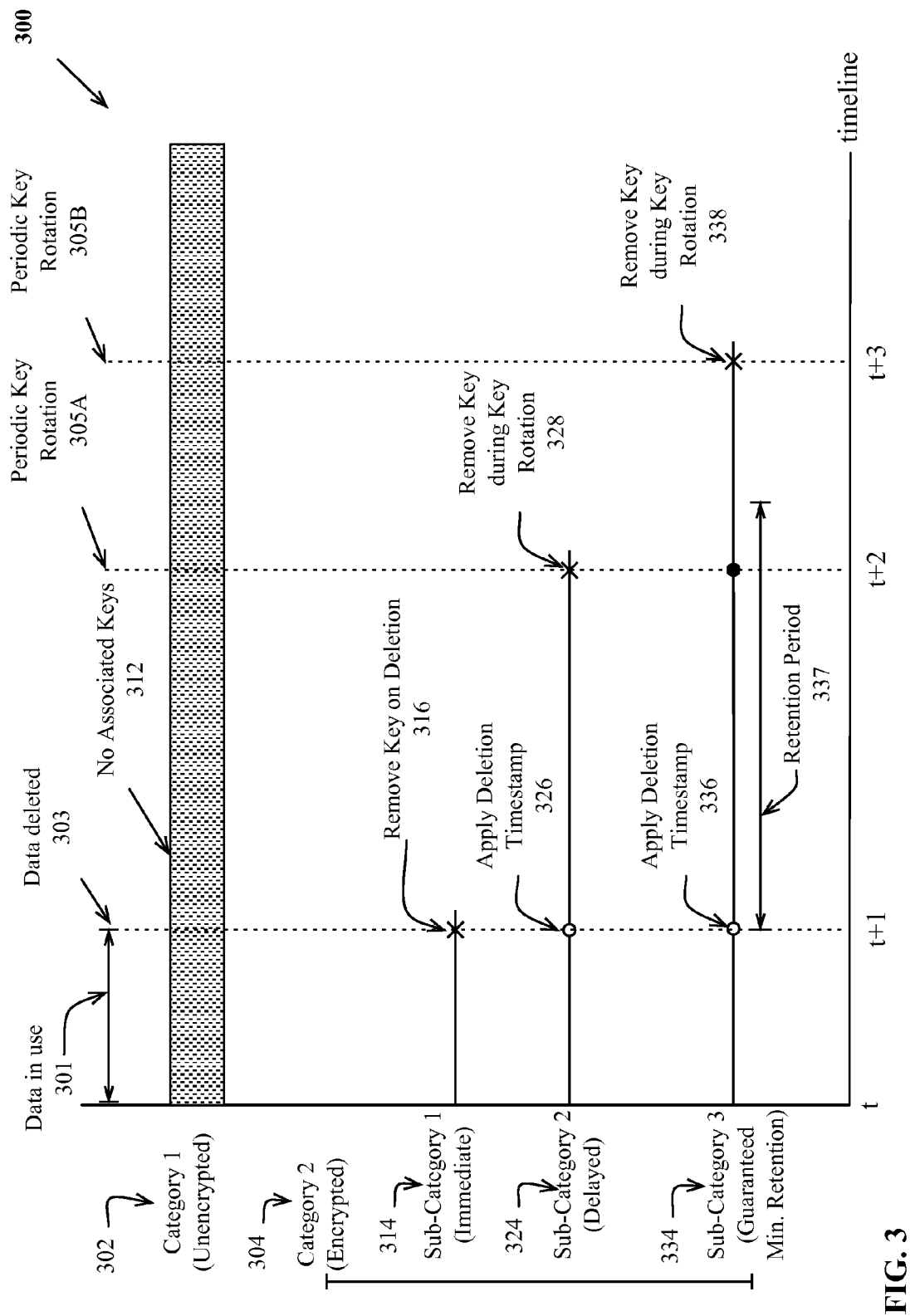
FIG. 3 illustrates a timeline of key retention or destruction for data of differing categories, according to one embodiment.

FIG. 3 illustrates a timeline 300 of key retention or destruction for data of differing categories, according to one embodiment. The timeline shows the first category 302 of unencrypted data and the second category 304 of encrypted data, where the second category 304 includes a first sub-category 314, a second sub-category 324, and a third sub-category 334. In the illustrated timeline 300, data of each category is in use during an in-use period 301 from time t to time t+1. At time t+1 data from each category is deleted 303.

The key management for each category of data differs once the data is deleted. In one embodiment, data in the first category 302 is stored unencrypted, is not securely deleted, and has no associated keys 312. Accordingly, the key manager does not perform any operations for data in the first category 302. Data in the first sub-category 314 of encrypted data is immediately rendered inaccessible (e.g., securely deleted) once the data is deleted at time t+1 and the key manager can remove 316 a key or set of keys associated with the data in the first sub-category 314 upon deletion of the data.

In one embodiment, data in the second sub-category 324 is insecurely deleted from storage at time t+1 and the key manager can apply a deletion timestamp 326 to the data. The deletion timestamp can indicate that data is to be invalidated at some point in the future when the key or set of keys associated with the data is deleted. At time t+2, during a first periodic key rotation 305A, the key or set of keys associated with the data in the second sub-category 324 may be removed 328.

In one embodiment data in the third sub-category 334 may be insecurely deleted from storage at time t+1 and the key manager can apply a deletion timestamp 336 to the data. However, data in the third sub-category 334 has a guaranteed minimum retention period 337. The data may be recovered or undeleted during the retention period 337, during which the data is in a purgatory state, and the key or keys associated with the data are retained until the retention period expires. Accordingly, even though the data is insecurely deleted at time t+1, the key or keys associated with the data are retained during the first periodic key rotation 305A at time t+2, as time t+2 is within the retention period 337. At time t+3, the retention period 337 has expired and, during a second period key rotation 305B, the key manager may remove the key 338.

Document Editing Interfaces

In several embodiments, various document editing systems and processes are described to support secure document editing and deletion within a secure communication ecosystem. The document editing systems and processes vary in underlying detail, but generally include a set of common features, elements, and properties. The document-editing systems each include an application or interface capable of securely communicating with a key manager to request or facilitate decryption of a document before editing. The document editing systems are configured to store data in an encrypted format and to avoid storing any unencrypted data, for example, to temporary storage caches. In one embodiment, system logic can be configured to actively prevent document-editing applications from storing un-encrypted document data to permanent storage. In one embodiment, the document-editing system includes or couples to an authorization service to authenticate users and permissions (e.g., account manager 175 as in FIG. 1).

Within the document editing systems, a document editing application or document manager can communicate with the key manager to encrypt all new versions of document data or related attributes and metadata (such as comments associated with the document). The system can separately store differing versions of a document and/or separately store discrete edits and comments to the documents. The document revision and/or version history can be stored in a modular format, such that separate changes or versions can be loaded separately, and removing an edit or comment does not damage the document as a whole. The document editing systems allow for specification of expiration times for document data, attributes, and metadata. Further, the systems can allow for different expiration times for different versions of the document. Based on the expiration times defined for document data, the editing and revision history for a document can progressively self-shred, such that the history of editing the document ages out of the document over time.

In one embodiment, document history can be removed in an event-based manner. For example, the document editing application of the document editing system can support a "track changes" or "show revisions" feature. When a user reviewing a tracked change accepts a change, the data representing the change can be securely deleted from the document. Additionally, where a reviewing user adds a comment, when the comment is deleted, the underlying data object storing the document can be securely deleted. Once a comment, revision, or edit is deleted, the secure deletion of the underlying data object can occur immediately or periodically based on the configured data category. In general, the secure deletion of the underlying data objects for document data can occur based on an expiration time assigned for the data, after every owner associated with the data has read or approved revisions or comments associated with a document, based on user or grouping of users (e.g., delete all of user A's comments). Alternatively, an administrator of the document editing system can manually choose to securely delete data or schedule a future deletion.

In one embodiment, the document editing system allows internal messages to be sent between users using a similar type of messaging security, such that the internal messages regarding document revisions can expire and/or be securely deleted. The system can also include a notification bridge to external systems to inform users that internal messages or document edits are available for review.

Figure 4:
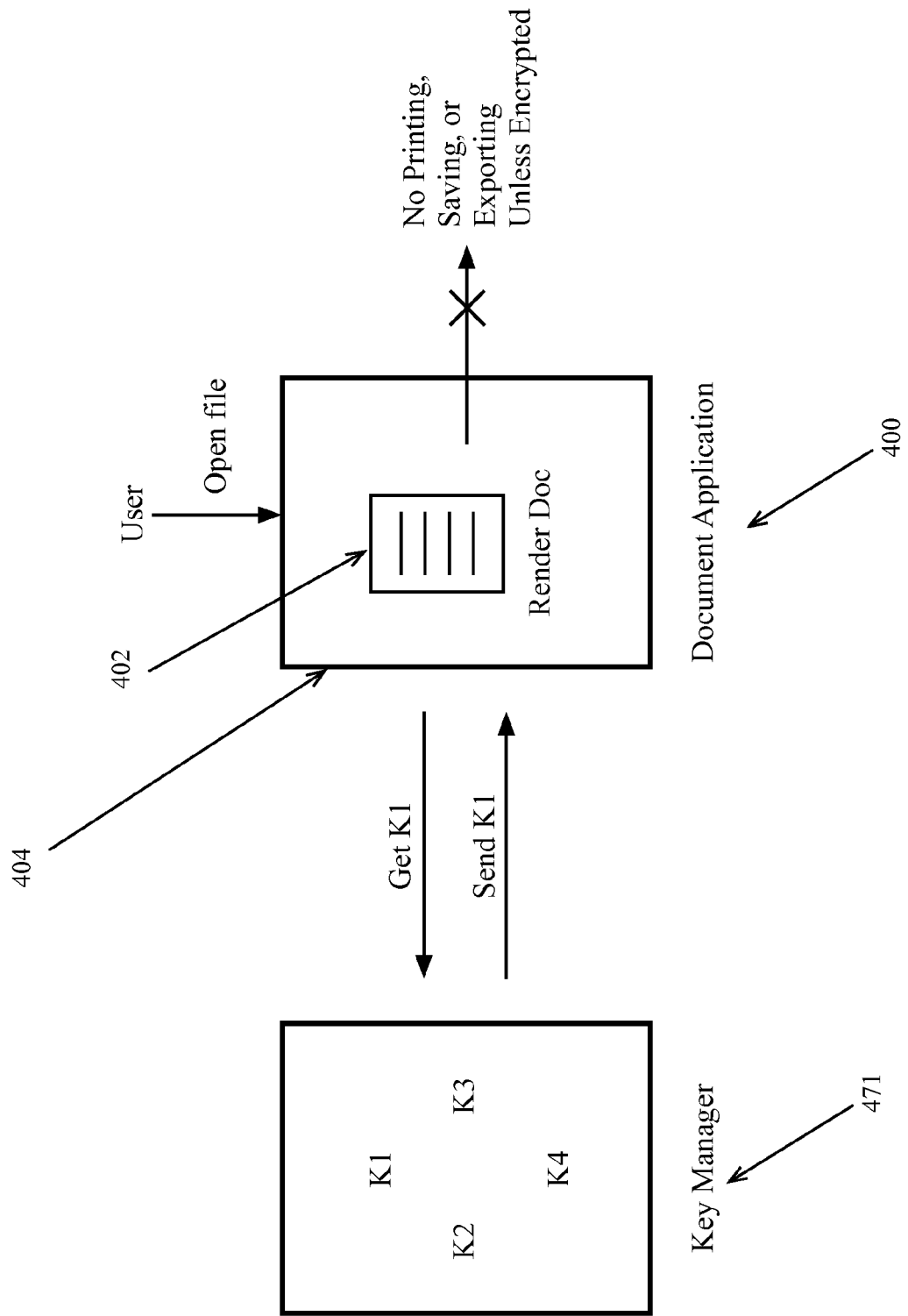
FIG. 4 is a block diagram of secure document editing via a document editing application, according to an embodiment.
Figure 5:
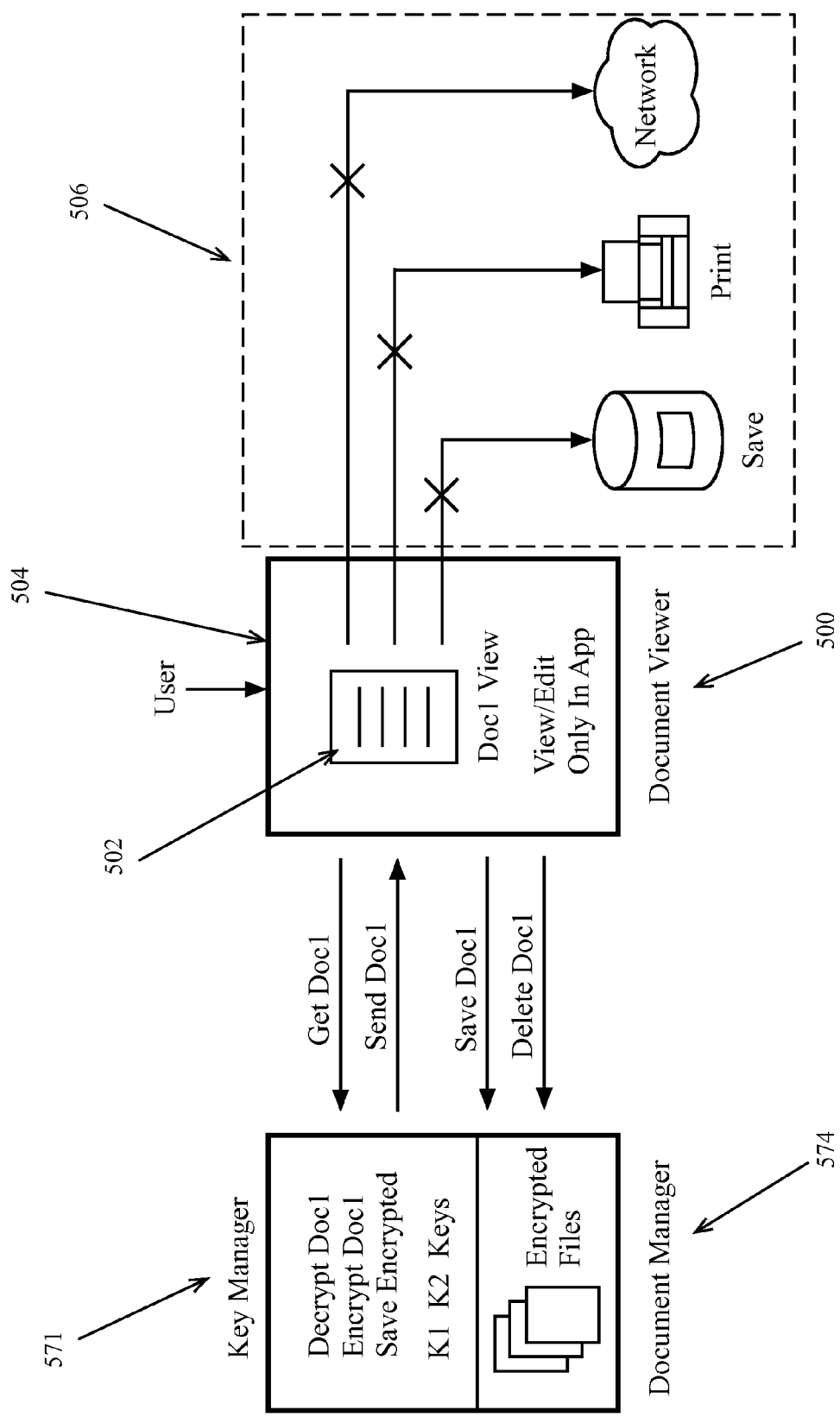
FIG. 5 is a block diagram of document viewing and editing a document managed by a document management system via a document viewer application, according to an embodiment.

In one embodiment, the document editing system can maintain or provide data checksums to guarantee data integrity, and may integrate with externally visible information to provide irrefutable documentation for certain document details that should be maintained, for example, that a specific change to the document, document attributes, document metadata, etc., was made at a particular time, even if the data underlying the change is to be securely deleted. In general, embodiments of the document editing system described herein provide a document collaboration system in which comments and drafts are handled in such a manner that the individual comments and drafts can be electronically shredded individually or in groups. FIGS. 4-5 illustrate two exemplary systems.

FIG. 4 is a block diagram of secure document editing via a document editing application 400, according to an embodiment. In one embodiment, secure document editing functionality is provided via a document application 400 that works in conjunction with a key manager 471, which may be a version of the key manager 171 shown in FIG. 1. The document application 400 can be a version of the document editor 151-152 shown in FIG. 1. The document application 400 can retrieve a document 402 from document storage (e.g., from storage system 104 as in FIG. 1, or stored locally on the clients 101-102) and request a set of one or more keys associated with the document from the key manager 471 to decrypt the encrypted portions of the document. The document can then be rendered for display on a display interface 404.

The document application 400 can prevent certain activities (e.g., based on the rules 173 shown in FIG. 1). For example, the document application 400 can exclude the functionality to print the document or can be externally prevented from printing the document, saving the document outside of the secure system, or sending the document over a communication interface without encryption using the assigned key.

The key manager 471 can store multiple sets of keys K1-K4, each set including at least one key. In one embodiment the document application 400 sends a get key request for a set of keys (e.g., K1) associated with an encrypted document. The key manager 471, in one embodiment, after authenticating the document application 400 and/or user associated with the document application, can transmit a send key message for the set of keys associated with the document 402 to the document application 400. Other techniques may also be used. In one embodiment, the document application 400 retrieves or computes a checksum, digest, or some other identifier associated with the document 402 and provides the document identifier to the key manager 171. The key manager 171 can then provide the set of keys K1 associated with the document. In one embodiment the document 402 can include multiple portions, each portion having a different key, where the multiple keys can be stored in a first set of keys K1 or can be distributed across multiple sets of keys K1-K4.

In one embodiment, when the document application 400 decrypts rendered document (e.g., each portion of rendered document) and renders the document 402 to a display 404 for editing, the document 402 may not actually be shown or presented as text data. Instead, document can be shown on the display 404 as a rendered image, for example, in a manner similar to a remote desktop display. In such embodiment, actual text data from the document may not be stored in memory as clear-text. Instead, image data representing the document is displayed.

FIG. 5 is a block diagram of a system for secure viewing and editing of document managed by a document manager 574 via a document viewer application 500, according to an embodiment. The system includes a document viewer 500, a key manager 571, and a document manager 574. The key manager 571 may be a version of the key manager 171 shown in FIG. 1. In one embodiment the document viewer 500 provides a remote view 502 of a document via a viewing and editing interface 504. In one embodiment the document viewer 500 is a remote application executed from a network storage device or via a network interface or can be web-based application displayed within a web browser. In one embodiment the viewing and editing interface 504 can be provided as part of a desktop display for a cloud-based or remote desktop environment. The remote execution environment displayed by the document viewer can be configured to restrict certain activities, where the set of restricted activities 506 can include restrictions on saving the file without encryption or to an unencrypted storage device, a restriction in printing the document, and/or a restriction on sending the document over a network without encryption.

In one embodiment the document viewer 500 executes on a client device, which is communicatively coupled with the document manager 571 and the key manager 571 over a network. The document manager 574 can store a set of encrypted documents, either on a storage device local to the document manager or in a remote data store (e.g., storage system 171 as in FIG. 1). The document viewer 500 can be used to issue a set of remote commands to the document manager 574. The document manager 574 can interface with the key manager 571 to perform encryption and decryption operations on the documents, such that the key manager maintains control of the keys. Upon request from the document viewer 500 to access a document, the document manager 574 can provide the encrypted document to the key manager 571, which can decrypt the document and provide the decrypted document to the document manager, which can provide a remote display of the document view 502 via the viewing and editing interface 504 of the document viewer 500. The remote view of the document can be provided such that unencrypted document data is maintained remotely and is not sent to the client device. The document manager 574 can save any revisions to the document upon request from the document viewer 500. The new version of the document may be saved separately. Additionally, revisions associated with the new version of the document (e.g., edits, comments, citations, etc.) can be saved separately.

Document Editing and Secure Deletion

Various processes and logic operations can be performed by the secure communication ecosystem to enable secure deletion of document data. In performing the processes, the document editing system described above can work in conjunction with a key management system to discretely encrypt and store document revisions and securely delete document revisions on demand or after an expiration period has passed.

The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order or may be optional under the circumstances and conditions described. Moreover, some operations can be performed in parallel rather than sequentially.

Figure 6:
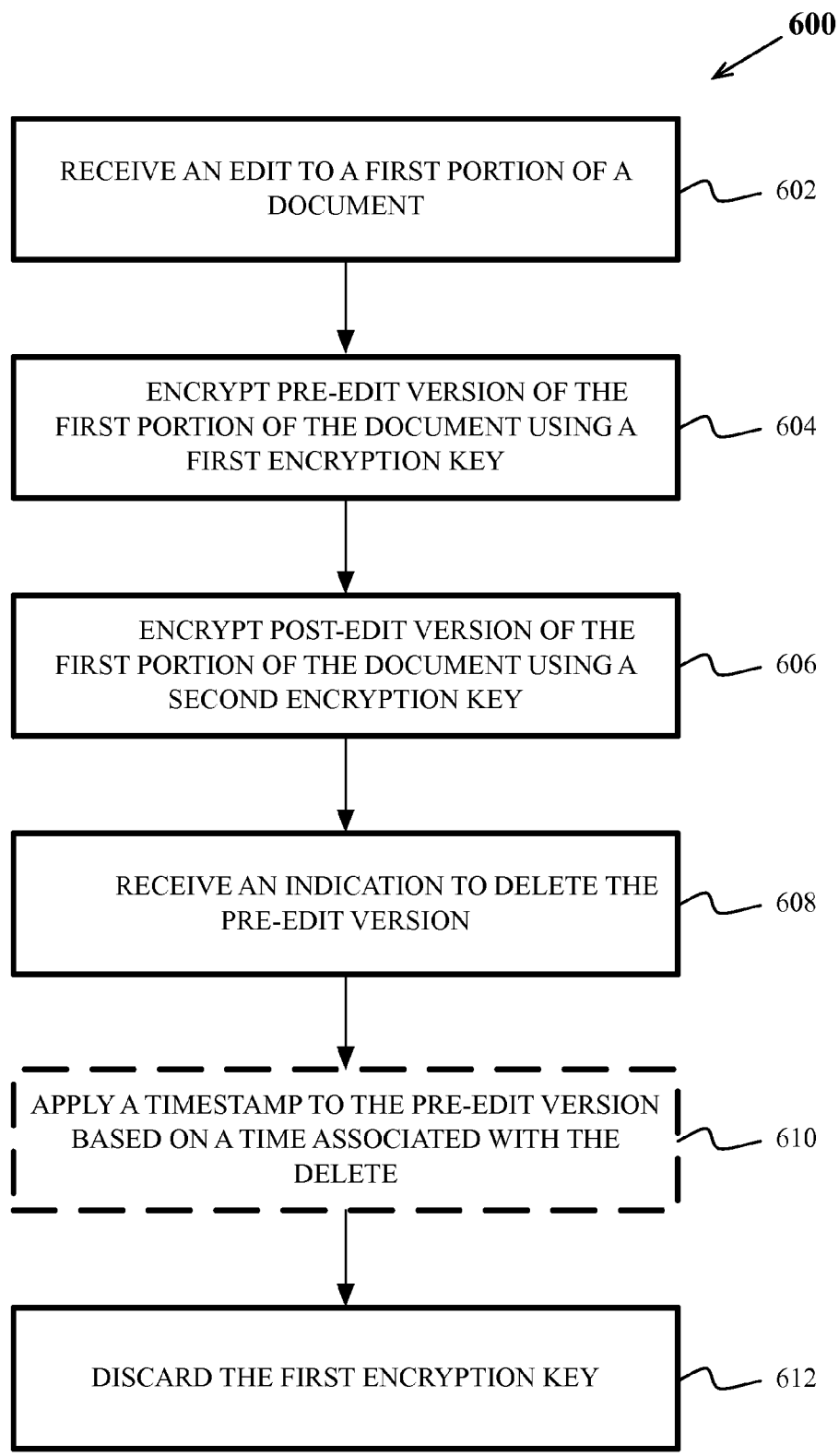
FIG. 6 is a flow diagram illustrating a process for editing a document and shredding a pre-edit version of the document, according to an embodiment.

FIG. 6 is a flow diagram illustrating a process 600 for editing a document and shredding a pre-edit version of the document, according to an embodiment. The process 600 can be performed by or on behalf of a document editing application on a client device or a remote document manager. For example, and with reference to FIG. 1, the process may be performed by the document editors 151-152 on the clients 101-102, or the document manager 174. The document editing application or document manager can perform encryption operations in concert with a key manager (e.g., key manager 171), where the key manager can supply keys for encryption or decryption, or can perform decryption and/or encryption on behalf of the document application.

Returning to FIG. 6, in one embodiment an edit to a first portion of a document can be received, as shown at block 602. The edit can be received at a document manager via a remote document viewer or at a document editor executing on a client device. At block 604, the document editor, document manager, key manager, or equivalent logic, can encrypt the pre-edit version of the first portion of the document using a first encryption key. It will be understood that the pre-edit version of the first portion of the document can also be encrypted using the first encryption key prior to receiving the edit at block 602.

As shown at block 606, the document editor, document manager, key manager, or equivalent logic can encrypt the post-edit version of the first portion of the document using a second encryption key, which may be a pre-generated key or a dynamically generated key that is generated by or on behalf of the key manager. As shown at block 608, at some point the document editor, document manager, key manager, etc., will receive an indication (e.g., request, command, input, etc.) to delete the pre-edit version.

Optionally, in response to the indication, the process 600 includes the application of a timestamp to the pre-edit version based on a time associated with the delete, as shown at block 610. The timestamp can be a time of deletion or a time in which the deleted data is to be securely deleted. The retention period for data to be securely deleted can vary among embodiments and/or based on the data category assigned to the data. The data may also be immediately securely deleted without the use of a timestamp or a retention period.

The key manager can perform secure deletion by discarding the first encryption key, as shown at block 612, rendering pre-edit version of the first portion of the document inaccessible.

Key Management and Secure Deletion Processes

FIG. 6 is a flow diagram illustrating a process 700 for fine-grained self-shredding of document data according to an embodiment. In one embodiment, fine-grained self-shredding is performed during a periodic key rotation. The key manager can perform the periodic key rotation based on an expiration period for one or more keys associated with one or more portions of data associated with documents having data to be securely deleted. Process 700 refers to data units, which may be data objects 112-113 or storage units 108-109 as in FIG. 1, or any other discrete unit of storage in the storage system 104, where each document or portion of a document is mapped to one or more discrete storage units, for example, as illustrated in FIG. 2.

In one embodiment, the key manager can decrypt each unit of managed data using a first key, as shown at block 702. The existing managed data can include currently existing data on the system that may possibly be securely deleted, including live data that has not been deleted and any insecurely deleted data that has not yet been securely deleted. While decrypting the existing data is shown at block 702 as a separate operation, in one embodiment the decryption of data at block 702 can be performed atomically in conjunction with the re-encryption operations at block 704 and block 706. In other words, decryption of data using a first key can be performed in hardware in conjunction with re-encryption using a different key as a single, atomic operation by a security module or security enhanced processor having hardware support for encryption. In an alternative implementation, re-encryption may take place as a separate operation that takes place before the first encryption key is discarded.

At block 704, the key manager can separately or atomically re-encrypt all each unit of live data on the system using a second key 704. Alternatively, instead of a second key, the key manager can also use a second group of related keys. At block 706, the key manager can re-encrypt each unit of deleted data that is still within a retention period for the data (e.g., purgatory data), which can vary for different types of data and can be dynamically determined by the system. The key manager can re-encrypt the deleted data using the second key, as in block 704, or can use a separate (e.g., third) key, such that deleted data within the retention period for the data may be securely deleted at the expiration of the retention period without expiring the live data or requiring the re-encryption of the live data.

As shown at block 708, the key manager can bypass the re-encryption of any deleted data that lies outside of the retention period for the data. Accordingly, when the key manager discards the first encryption key at block 710, the data that bypassed at block 708 and not re-encrypted at block 704 or block 706, is rendered inaccessible.

Figure 8:
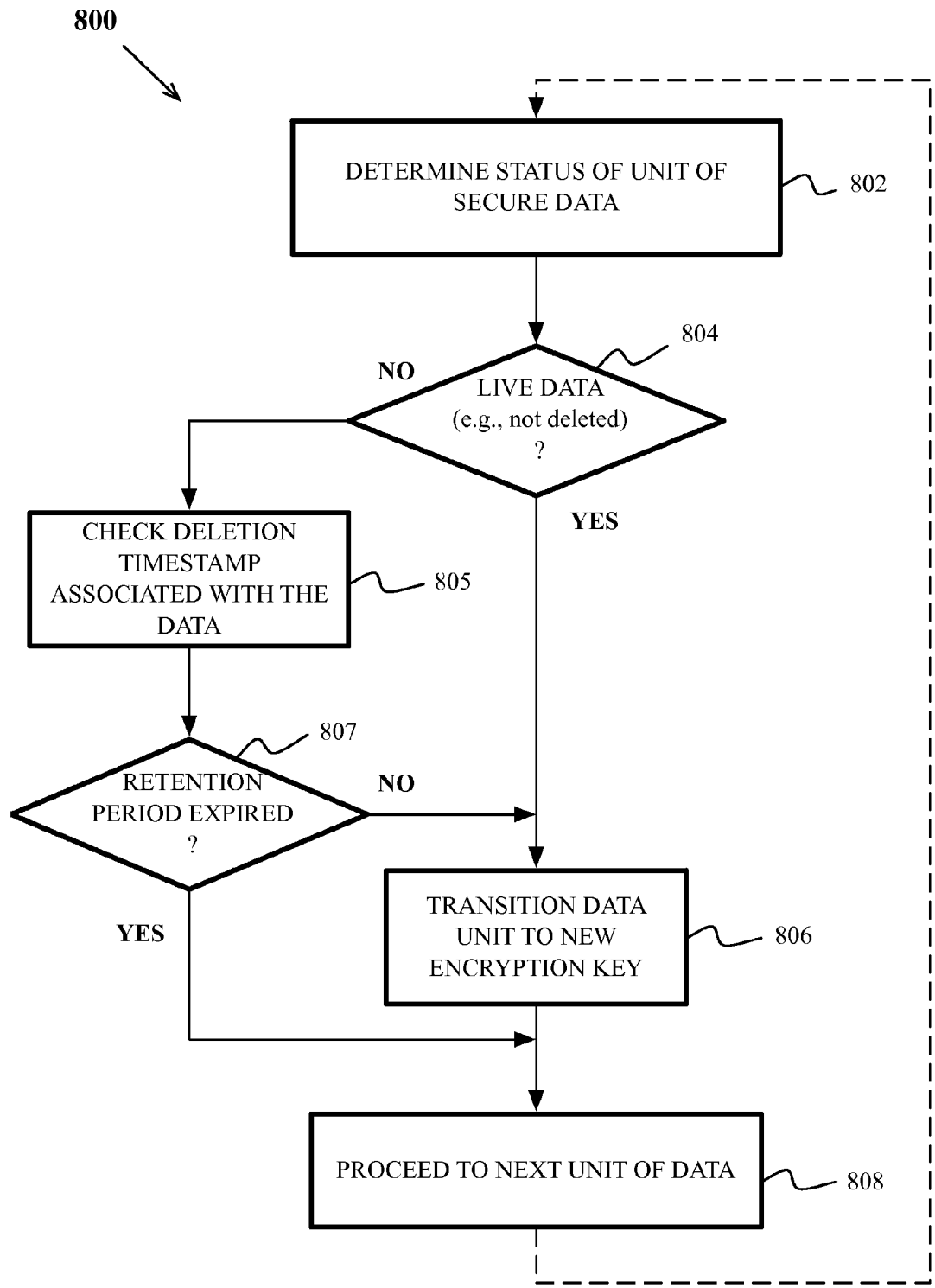
FIG. 8 is a flow diagram of a process at a key manager to perform secure deletion during a periodic key rotation, according to an embodiment

FIG. 8 is a flow diagram of a process 800 at a key manager to perform secure deletion during a periodic key rotation, according to an embodiment. The process 800 illustrates operation for the key manager at the detail of a single data unit, as a data unit is a discrete unit of data storage, as described above with respect to FIG. 6. The key manager, periodically or in response to an indication to perform an immediate secure deletion operation, can iterate over each block of managed data in the system.

As shown at block 802 in one embodiment the key manager (or equivalent logic) can determine the status of a unit of secure data. At block 804 the key manager can determine if the unit of data is live data or other data that has not been deleted. If the unit of data is live data, the unit of data can be transitioned to a new expiration key during the key rotation, as shown at block 806. If the unit of data is not live data at block 804, the key manager can check a deletion timestamp associated with the data at block 805. The deletion timestamp can be a time of deletion for the unit of data or other indication that may be used to determine whether the unit of data is still within a retention period for the unit of data. Additionally, the deletion timestamp checked may be on the data or may be on the key or set of keys associated with the data.

The key manager can then determine at block 807 whether the retention period for the unit of data has expired. If the retention period for the unit of data has expired, then the unit of data is bypassed and the key manager can proceed to the next unit of data at block 808 without transitioning the expired data to the new encryption key. In one embodiment, the process 800 illustrated can be performed systematically for each unit of managed data, and the key manager will proceed from block 808 to block 802 until each unit of managed data is processed.

Figure 9:
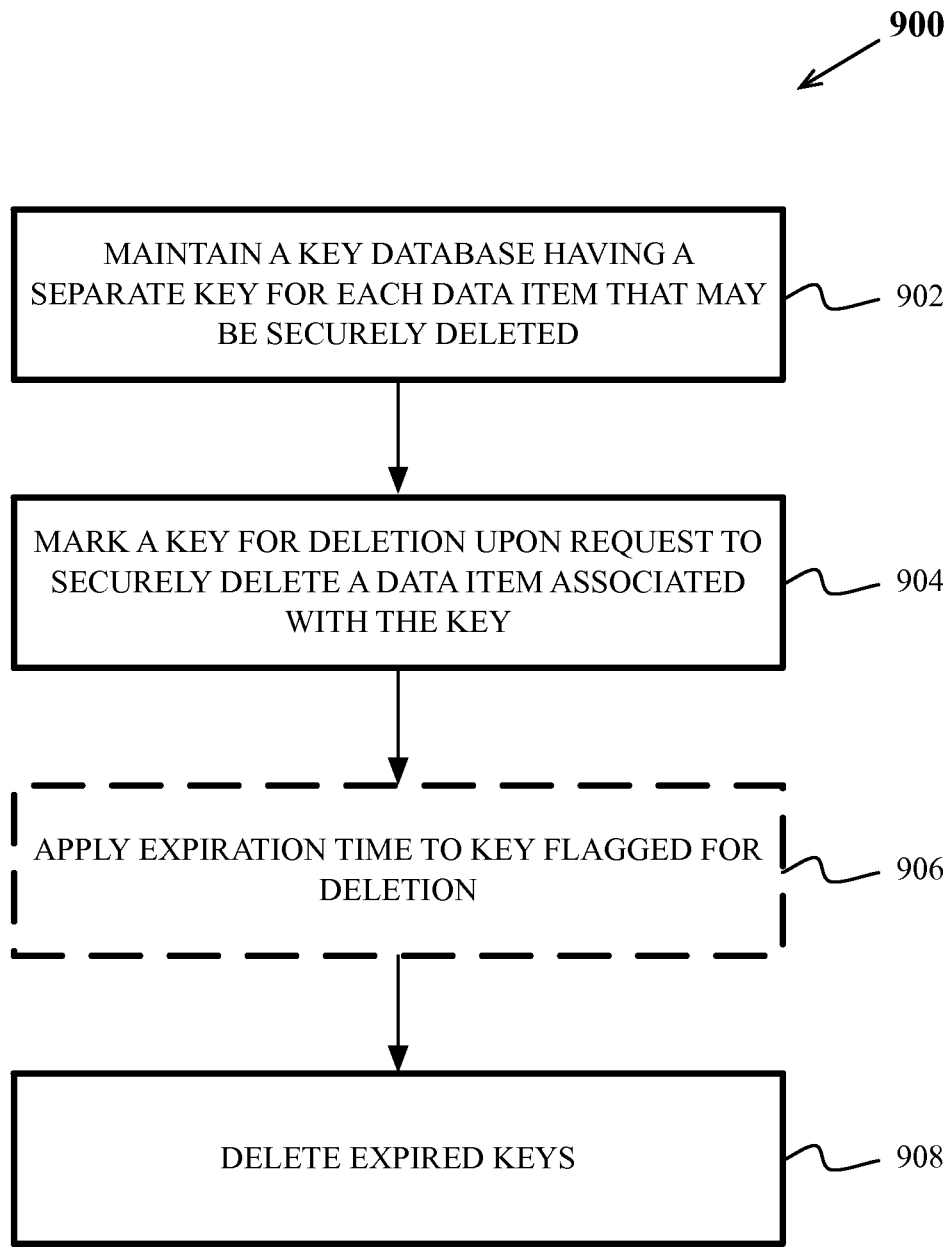
FIG. 9 is a flow diagram of a process of secure deletion when maintaining a separate key for each data item.

FIG. 9 is a flow diagram of a process 900 of secure deletion when maintaining a separate key for each data item. The data items referenced in process 900 can be a data unit or a group of data units, where the data units are discrete units of data storage, as described above with respect to FIG. 7, and can be performed by a key manager as described herein.

In one embodiment, the key manager maintains a key database having a separate key for each data item that may be securely deleted, as shown at block 902. At block 904, the key manager can mark a key for deletion upon request to securely delete a data item associated with the key. In one embodiment, the key manager can apply an expiration time to a key once the key is flagged for deletion, as shown at block 906. Subsequently, any expired keys can be deleted at block 908. Alternatively, keys marked for deletion may be immediately deleted. In one embodiment, the key manager can delete the expired keys at block 908 using a secure deletion method. For example, the key manager can encrypt a key to be deleted using a new encryption key. The new encryption key can then be discarded.

Figure 7:
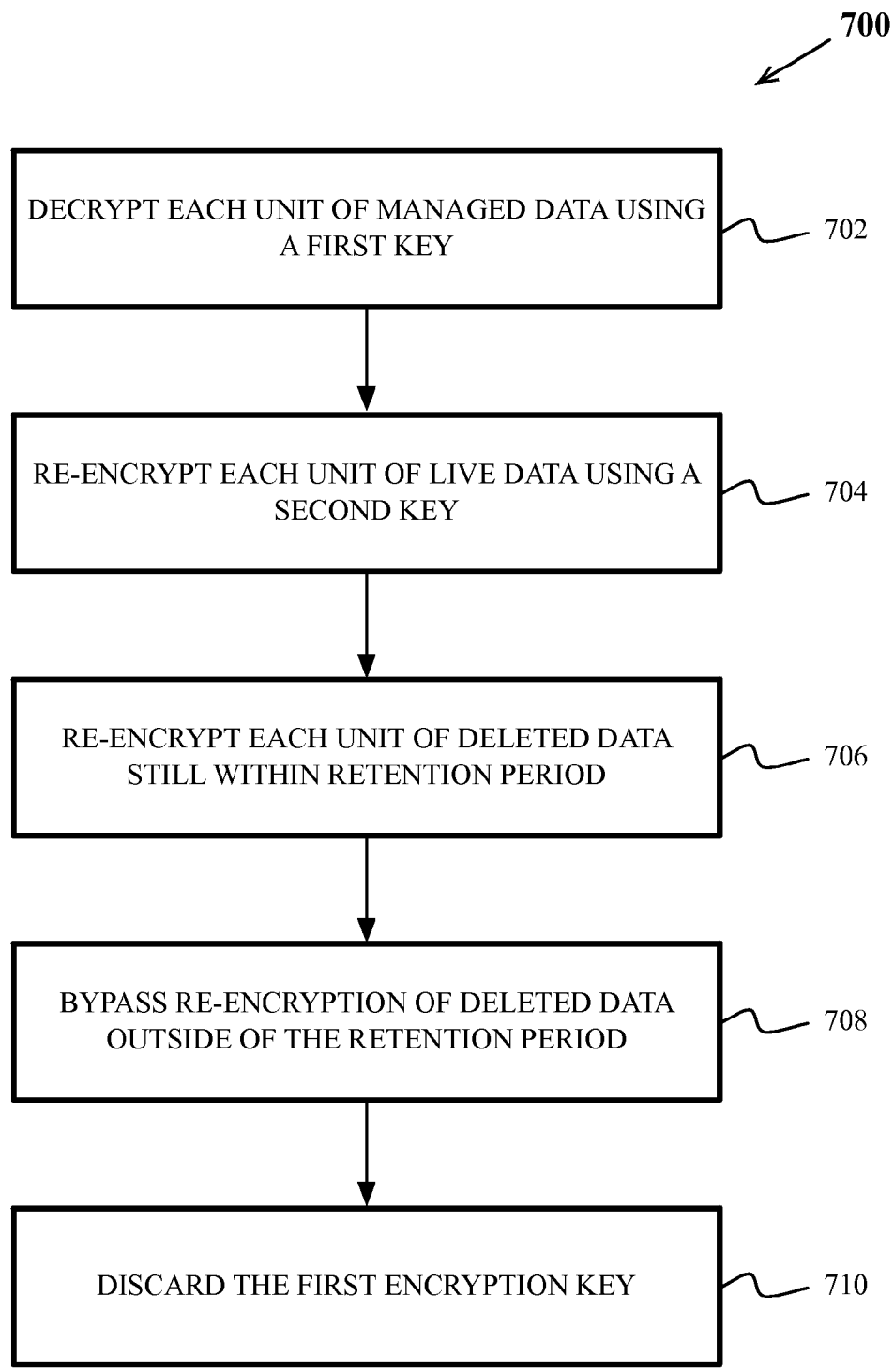
FIG. 7 is a flow diagram illustrating a process for fine-grained self-shredding of document data according to an embodiment.

The process 900 of FIG. 9 can be performed in a separate embodiment from process 700 of FIG. 7 or process 800 of FIG. 8. In other words, embodiments can differ as to whether the key management process uses periodic key rotation mechanism or uses a separate key for each unit of secure data. The key rotation used as in process 700 and/or process 800 have a reduced number of keys to be managed at any given time but include additional computational overhead due to the periodic re-encryption. The separate key system of process 900 does not explicitly utilize key-rotation or re-encryption but includes increased key management overhead for the large number of encryption keys to manage for each unit of data. However, the processes described herein are not mutually exclusive, and in one embodiment separate key management as in process 900 is combined with periodic data rotation as in process 700 and/or process 700. Moreover, the separate key management as in process 900 can be used to manage a set of keys associated with a user, a group of user, or an organization, where the encryption keys are used to decrypt an additional set of keys used to manage document data, where the document data encryption keys are managed via key rotation.

Exemplary Data Processing System

Figure 10:
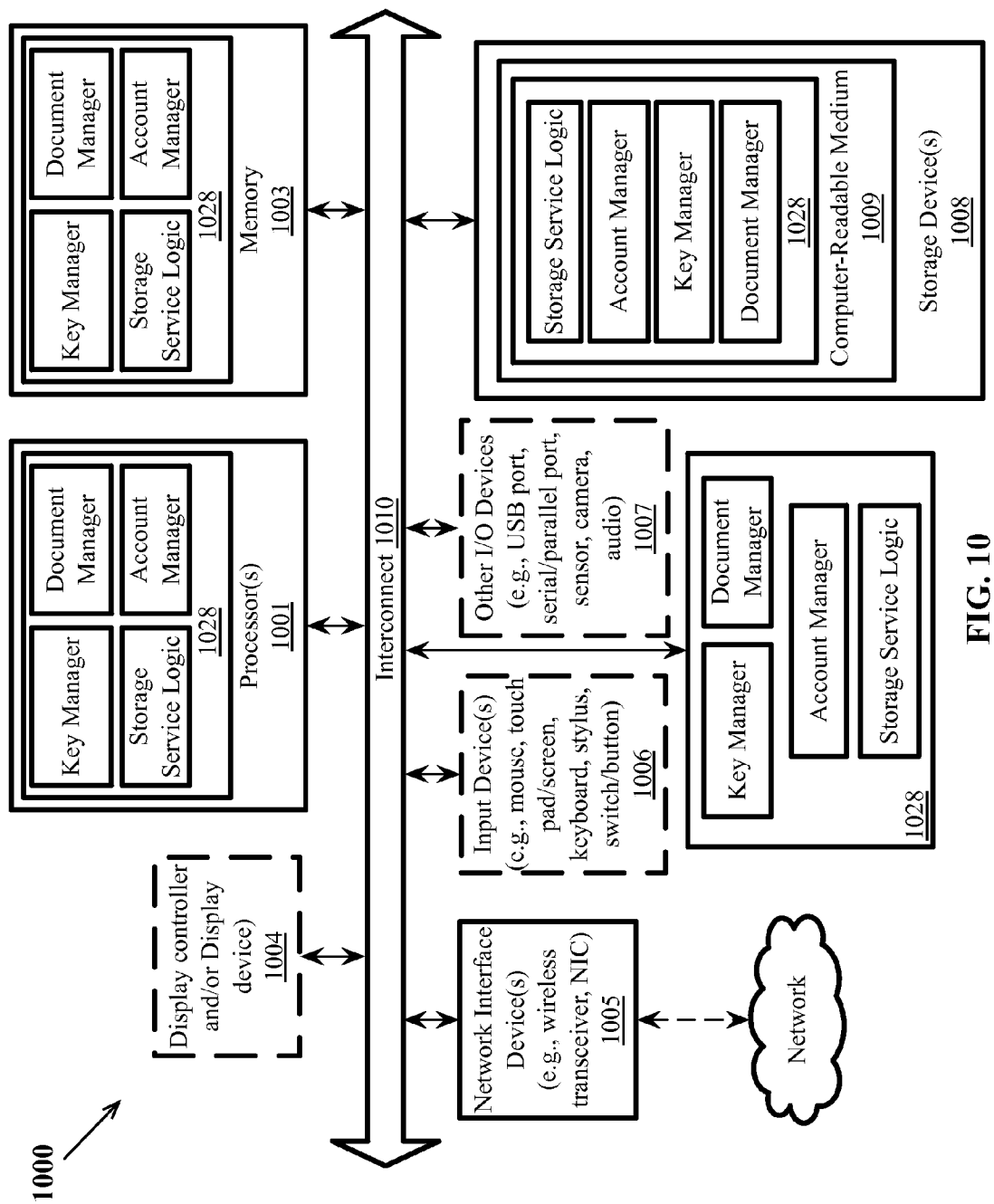
FIG. 10 is a block diagram illustrating a data processing system according to an embodiment.

FIG. 10 is a block diagram illustrating an example of a data processing system that may be used with one embodiment of the invention. For example, system 1000 may represent any of data processing systems described above performing any of the processes or methods described above. System 1000 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1000 is intended to show a high level view of many components of the computer system. However, it is to be understood that additional components may be present in certain implementations and furthermore, different arrangement of the components shown may occur in other implementations. System 1000 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1000 includes processor 1001, memory 1003, and devices 1005-1008 via a bus or an interconnect 1010. Processor 1001 may represent a single processor or multiple processors with a single processor core or multiple processor cores included therein. Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1001, which may be a low power multi-core processor socket such as an ultra-low voltage processor, may act as a main processing unit and central hub for communication with the various components of the system. Such processor can be implemented as a system on chip (SoC). Processor 1001 is configured to execute instructions for performing the operations and/or steps discussed herein. System 1000 may further include a graphics interface that communicates with optional graphics subsystem 1004, which may include a display controller, a graphics processor, and/or a display device.

Processor 1001 may communicate with memory 1003, which in one embodiment can be implemented via multiple memory devices to provide for a given amount of system memory. Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001, or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1000 may further include IO devices such as devices 1005-1008, including network interface device(s) 1005, optional input device(s) 1006, and other optional IO device(s) 1007. Network interface device 1005 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, input device 1006 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 1007 may include an audio device. An audio device may include a speaker and/or a microphone to facilitate voice-enabled functions, such as voice recognition, voice replication, digital recording, and/or telephony functions. Other I/O devices 1007 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1007 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1010 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, a mass storage (not shown) may also couple to processor 1001. In various embodiments, to enable a thinner and lighter system design as well as to improve system responsiveness, this mass storage may be implemented via a solid-state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor 1001, e.g., via a serial peripheral interface (SPI). This flash device may provide for non-volatile storage of system software, including basic input/output software (BIOS) as well as other firmware of the system.

Storage device 1008 may include computer-accessible storage medium 1009 (also known as a machine-readable storage medium or a computer-readable medium) on which is stored one or more sets of instructions or software (e.g., module, unit, and/or logic 1028) embodying any one or more of the methodologies or functions described herein. Module/unit/logic 1028 may also reside, completely or at least partially, within memory 1003 and/or within processor 1001 during execution thereof by data processing system 1000, memory 1003, and processor 1001 constituting machine-accessible storage media. Module/unit/logic 1028 may further be transmitted or received over a network via network interface device 1005.

Computer-readable storage medium 1009 may also be used to store the some software functionalities described above persistently. While computer-readable storage medium 1009 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1028, components and other features described herein can be implemented as discrete hardware components or integrated in the functionality of hardware components such as ASICS, FPGAs, DSPs or similar devices. In addition, module/unit/logic 1028 can be implemented as firmware or functional circuitry within hardware devices. Further, module/unit/logic 1028 can be implemented in any combination hardware devices and software components.

Note that while system 1000 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer document files management system comprising:
   a computer processor;
   a non-transitory computer-readable memory coupled to the computer processor storing instructions for execution;
   a storage system coupled to the computer processor storing one or more encrypted documents that are electronic computer files, the encrypted documents including a first encrypted document comprising at least a first portion and a second portion encrypted using a first encryption key and a second encryption key respectively, wherein the first and second portions are fine-grained data stored using data object segmentation, wherein each of the first and second portions of the first encrypted document includes at least a comment or an edit;
   an encryption key manager loaded into the memory and executed by the processor to manage a set of encryption keys for the documents on the storage system, the encryption key manager cause the processor to further discard the first encryption key in response to receiving an indication for secure removal of the first portion of the first encrypted document encrypted using the first encryption key to render the first portion of the first encrypted document immediately inaccessible while the second portion of the first encrypted document remains accessible; and
   a security module loaded into the memory and executed by the processor to encrypt one or more documents with a set of encryption keys using a predetermined encryption algorithm.

2. The system as in claim 1, wherein the secure removal of the first portion of the first encrypted document causes the first portion to become inaccessible by user accounts associated with at least a first registered user or group of registered users of the document management system.

3. The system as in claim 2, wherein the secure removal of the first portion of the first encrypted document causes the first portion to become inaccessible by all accounts associated with the document management system.

4. The system as in claim 1, wherein the first portion of the first encrypted document includes a previous revision of the first encrypted document.

5. The system as in claim 4, wherein the previous revision includes a previous version of the first encrypted document or a change between differing versions of the first encrypted document.

6. The system as in claim 1, wherein the first portion of the first encrypted document includes a comment associated with a version of the first encrypted document.

7. The system as in claim 1, wherein the encryption key manager is further to provide secure removal of the first encrypted document by discarding the first encryption key.

8. The system as in claim 1, wherein the encryption key manager is to discard the first encryption key re-encrypt the second portion using the second encryption key during a key rotation.

9. The system as in claim 8, wherein the encryption key manager is to discard the first encryption key after an expiration time to render the first portion inaccessible.

10. The system as in claim 8, wherein the storage system is further to delete the first portion and flag the first portion with a time of deletion and the encryption key manager is further to discard the first encryption key during the key rotation when the time of deletion is outside of a retention period.

11. The system as in claim 10, wherein the encryption key manager is further to re-encrypt the first portion using a third encryption key to preserve recoverability of the first portion when the time of deletion is within the retention period.

12. The system as in claim 11, wherein the encryption manager is to decrypt the first portion using the first encryption key and re-encrypt the first portion using the third encryption key as an atomic operation.

13. The system as in claim 1, further comprising a document editor to provide authenticated access to the one or more encrypted documents on the storage system, wherein the document editor is local to a client system.

14. The system as in claim 1, further comprising a document management unit to provide authenticated access to the one or more encrypted documents on the storage system, wherein the document management unit is to provide authenticated access to the documents on the storage system via an interface to a document viewer application.

15. The system as in claim 14, wherein the interface to the document viewer application is to display a visual representation of a decrypted document without providing a clear-text representation of the document and the decrypted document is remote to a client system.

16. A non-transitory machine-readable medium storing instructions which, when executed by one or more processors, cause the one or more processors to perform operations comprising:
receiving an edit to a first portion and a second portion of a document that is an electronic computer file, wherein the first and second portions are fine-grained data to be stored using data object segmentation, and wherein each of the first and second portions of the first encrypted document includes at least a comment or an edit;
encrypting a pre-edit version of the first portion of the document separated from the second portion using a first encryption key before storing the pre-edit version to a storage system;
encrypting a post-edit version of the first portion of the document separated from the second portion using a second encryption key before storing the post-edit version to the storage system;
receiving an indication to delete the pre-edit version of the first portion of the document; and
discarding the first encryption key to render the pre-edit version of the first portion of the document immediately inaccessible.

17. The medium as in claim 16, the operations further comprising applying a timestamp to the pre-edit version based on a time associated with the indication to delete the pre-edit version.

18. The medium as in claim 17, the operations further comprising:
re-encrypting the post-edit version using a third encryption key;
determining whether the pre-edit version is within a retention period; and
re-encrypting the pre-edit version using a third encryption key when the pre-edit version is within the retention period.

19. The medium as in claim 18, wherein the timestamp indicates an expiration time of the retention period.

20. The medium as in claim 18, wherein the timestamp indicates a time of deletion and the retention period is configurable based on a type of content.

21. The medium as in claim 18, the operations further comprising additionally encrypting the post-edit version using a fourth encryption key associated with an authenticated user.

22. The medium as in claim 17, wherein the post-edit version of the first portion of the document includes a comment regarding the document and the operations further comprise discarding the second encryption key after the post-edit version of the first portion of the document is accessed by a pre-determined set of authenticated accounts.

23. A computer-implemented method comprising:
receiving an edit to a first portion and a second portion of a document that is an electronic computer file, wherein the first and second portions are fine-grained data to be stored using data object segmentation, and wherein each of the first and second portions of the first encrypted document includes at least a comment or an edit;
encrypting by a security module executed by a computer processor a pre-edit version of the first portion of the document separated from the second portion using a first encryption key before storing the pre-edit version to a storage system;
encrypting by the security module executed by the computer processor a post-edit version of the first portion of the document separated from the second portion using a second encryption key before storing the post-edit version to the storage system;
receiving an indication to delete the pre-edit version of the first portion of the document;
applying a timestamp to the pre-edit version based on a time associated with the delete; and
discarding the first encryption key to render the pre-edit version of the first portion of the document immediately inaccessible.

24. The method as in claim 23, further comprising:
re-encrypting the post-edit version using a third encryption key;
determining whether the timestamp indicates that the pre-edit version is within a retention period; and
re-encrypting the pre-edit version using a third encryption key when the pre-edit version is within the retention period, wherein discarding the first encryption key includes encrypting the first encryption key using a fourth encryption key and discarding the fourth encryption key.

\* \* \* \* \*